United States Patent
Kang et al.

(10) Patent No.: US 10,267,408 B2
(45) Date of Patent: Apr. 23, 2019

(54) LINEAR TRANSMISSION DEVICE WITH LUBRICATION UNIT

(71) Applicant: HIWIN TECHNOLOGIES CORP., Taichung (TW)

(72) Inventors: Chao-Yuan Kang, Taichung (TW); Wei-Ying Chu, Taichung (TW); Chun-Jen Huang, Taichung (TW); Pei-Ling Chung, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 215 days.

(21) Appl. No.: 15/151,101

(22) Filed: May 10, 2016

(65) Prior Publication Data
US 2017/0328463 A1    Nov. 16, 2017

(51) Int. Cl.
*F16H 25/22* (2006.01)
*F16H 57/04* (2010.01)

(52) U.S. Cl.
CPC ..... *F16H 57/0497* (2013.01); *F16H 25/2204* (2013.01)

(58) Field of Classification Search
CPC ...... F16H 25/12; F16H 25/2204; F16H 25/24; F16H 57/0424; F16H 57/0497
USPC ...................................... 184/6.12, 6.14, 6.16
See application file for complete search history.

(56) References Cited

U.S. PATENT DOCUMENTS

| | | | | |
|---|---|---|---|---|
| 3,132,719 A * | 5/1964 | Cole | .................. | F16H 25/2204 184/101 |
| 5,809,838 A * | 9/1998 | Miyaguchi | .......... | F16H 25/2214 74/89.44 |
| 6,155,717 A * | 12/2000 | Michioka | ............ | F16C 29/0642 384/13 |
| 6,220,393 B1 * | 4/2001 | Oh | ........................ | F04B 35/045 184/32 |
| 6,688,431 B2 * | 2/2004 | Oh | ........................ | F04B 35/045 184/6.16 |
| 8,302,499 B2 * | 11/2012 | Chen | ................... | F16H 57/0497 74/89.43 |
| 8,893,570 B2 * | 11/2014 | Chuo | .................. | F16H 57/0497 184/5 |
| 2010/0294056 A1 * | 11/2010 | Lin | ..................... | F16C 29/0647 74/89.44 |
| 2013/0081490 A1 * | 4/2013 | Chiang | ..................... | F16N 9/00 74/89.44 |

FOREIGN PATENT DOCUMENTS

TW         201015000 A        4/2010

\* cited by examiner

*Primary Examiner* — Minh Truong
(74) *Attorney, Agent, or Firm* — Muncy, Geissler, Olds & Lowe, P.C.

(57) ABSTRACT

A linear transmission device includes a shaft, a moving member movably provided on the shaft, and a lubrication unit provided at the moving member. The lubrication unit has a lubricant container and a block. The lubricant container has a storage space which communicates with the interior of the moving member via a lubricant dispensing opening. The block is provided in the storage space of the lubricant container and can be displaced by an inertial force generated by movement of the moving member so that, during its displacement, the block squeezes the lubricant in the storage space, thereby driving the lubricant into the interior of the moving member through the lubricant dispensing opening for lubrication.

3 Claims, 9 Drawing Sheets

LINEAR TRANSMISSION DEVICE WITH LUBRICATION UNIT

BACKGROUND OF THE INVENTION

1. Technical Field

The present invention relates to linear transmission devices and more particularly to a linear transmission device with a lubrication unit.

2. Description of Related Art

Linear transmission devices such as ball screws and linear guideways are very efficient in mechanical transmission and are therefore widely used in machines demanding high-precision movement. Without timely lubrication, however, friction between the moving member and the shaft of a linear transmission device tends to increase after long-term use, thus accelerating wear and tear of the linear transmission device.

In the prior art, Taiwan Patent Application Publication No. 201015000 discovers a nut provided with a receiving space for storing a lubricating oil or grease. The lubricating oil or grease is squeezed into the gap between the nut and a screw rod by a piston while the piston is being displaced, or pulled, by the restoring force of an elastic member. When it is determined according to a change in position of the piston that the lubricating oil or grease needs replenishment, the receiving space is refilled by first pulling out the piston and then adding more lubricating oil or grease into the receiving space. Once refilling is completed, the piston is put back in place so that lubrication can be carried out again. According to the afore-cited patent application, the lubricating oil or grease not only may leak, but also needs to be replenished on a regular basis, which causes inconvenience in use.

BRIEF SUMMARY OF THE INVENTION

The primary objective of the present invention is to provide a linear transmission device having a lubrication unit which effectively solves the leakage problem in the prior art and can add to the convenience of use by performing lubrication each time a moving member is moved.

To achieve the above objective, the present invention provides a linear transmission device which includes an shaft, a moving member, and a lubrication unit. The moving member is provided on the shaft and can move along the shaft. The lubrication unit has a lubricant container and a first block. The lubricant container is provided at the moving member and has a storage space. The storage space is in communication with the interior of the moving member via a lubricant dispensing opening. The first block is provided in the storage space of the lubricant container in a displaceable manner.

Once the moving member begins to move, it generates an inertial force which displaces the first block to a lubricant dispensing position. During the process, the first block squeezes the lubricant in the storage space such that the lubricant in the storage space is added into the interior of the moving member through the lubricant dispensing opening to provide lubrication.

To adapt lubricants of different viscosities, the lubrication unit preferably also provides a second block. The second block is provided in the storage space of the lubricant container and can move with the first block. When the moving member is still, the second block covers the lubricant dispensing opening to prevent over-lubrication. When the moving member begins to move, the second block uncovers the lubricant dispensing opening so that the lubricant, squeezed by the first block, is released into the interior of the moving member.

DETAILED DESCRIPTION OF THE INVENTION

Figure 1:
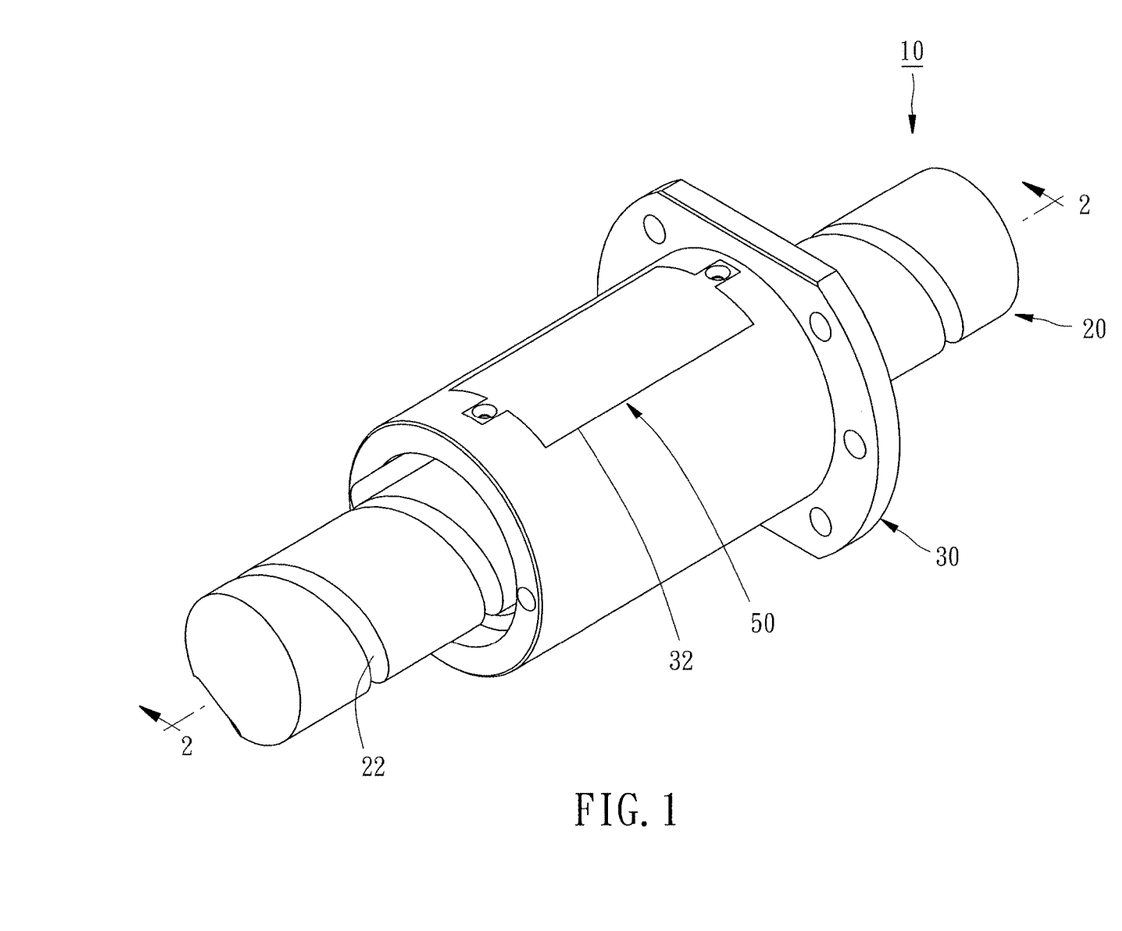
FIG. 1 is a perspective view of the first embodiment of the present invention.
Figure 2:
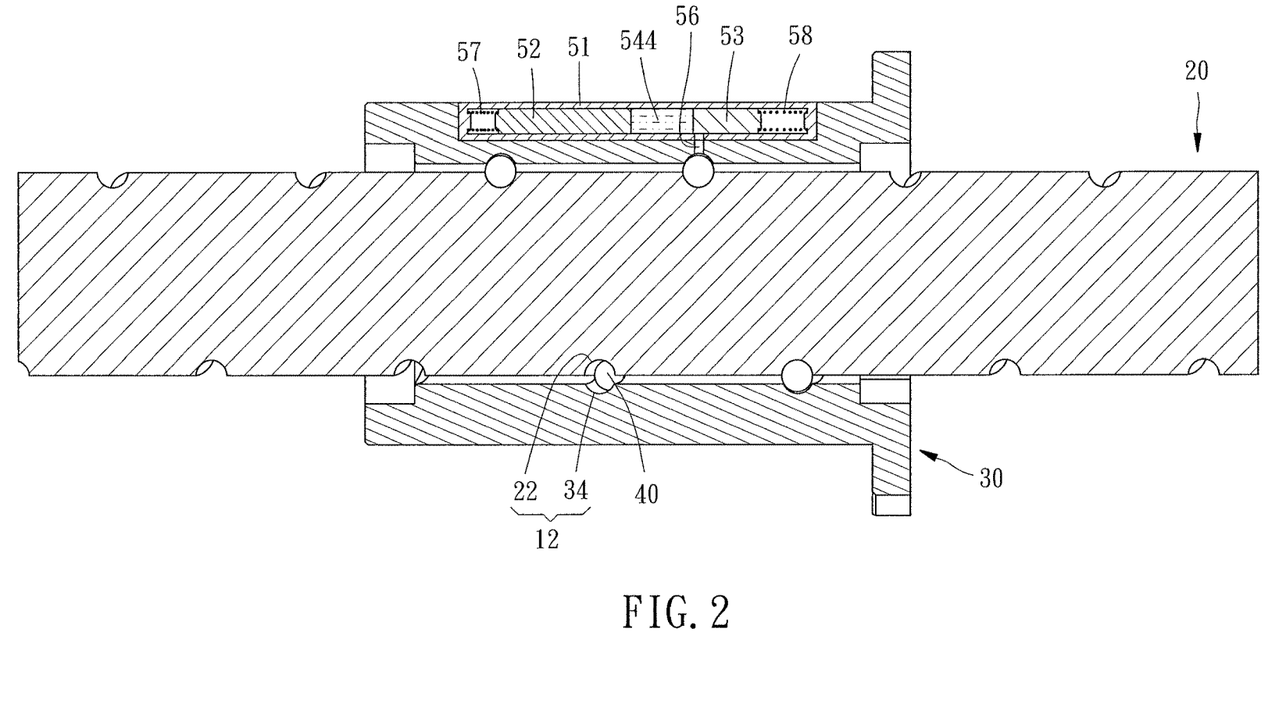
FIG. 2 is a sectional view taken along the line 2-2 in FIG. 1.

Referring to FIG. 1 and FIG. 2, the linear transmission device 10 in the first embodiment of the present invention includes a shaft 20, a moving member 30, a plurality of balls 40, and a lubrication unit 50. In this embodiment, the linear transmission device 10 is a ball screw, so the shaft 20 and the moving member 30 are a threaded shaft and a nut respectively.

The shaft 20 has an external thread 22 on its periphery.

The moving member 30 is mounted around the shaft 20 and can be moved back and forth along the shaft 20. The moving member 30 has a lubricant container mounting groove 32 on its outer periphery and an internal thread 34 on its inner periphery. The internal thread 34 of the moving member 30 corresponds to the external thread 22 of the shaft 20 such that a load channel 12 is formed therebetween.

The balls 40 are provided in the load channel 12 in a rolling manner.

Figure 3:
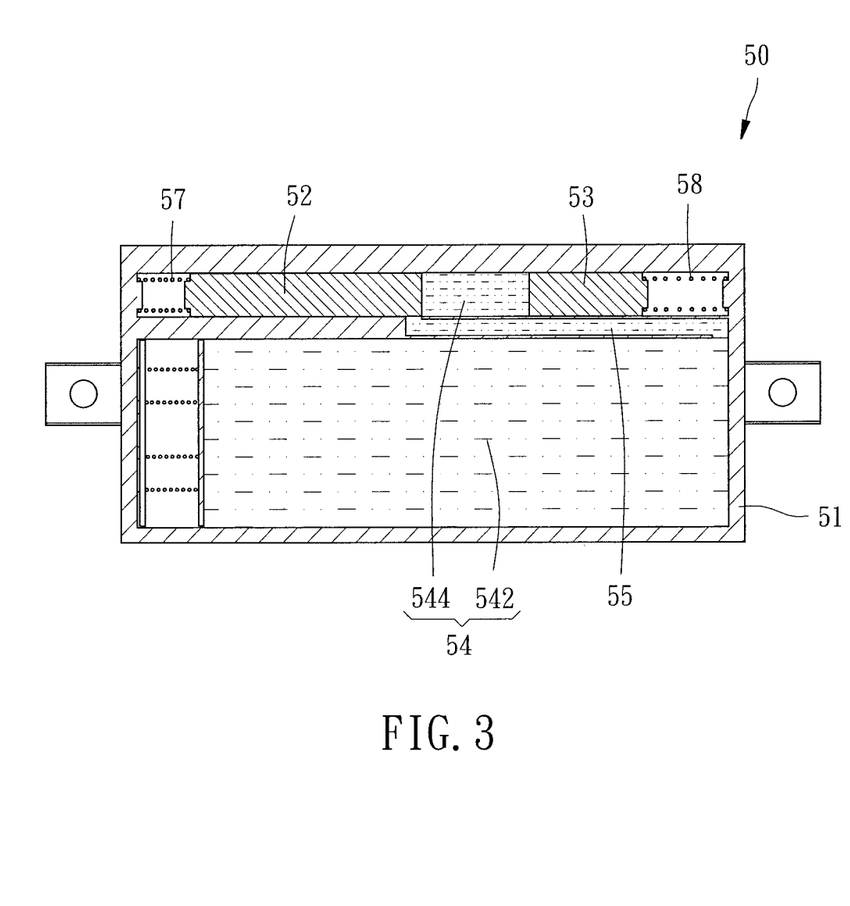
FIG. 3 is a sectional view of the lubrication unit in the first embodiment of the present invention.

The lubrication unit 50 in this embodiment has a lubricant container 51, a first block 52, and a second block 53. The lubricant container 51 is provided in the lubricant container mounting groove 32 of the moving member 30 and has a storage space 54. As shown in FIG. 2 and FIG. 3, the storage space 54 is divided into a first lubricant storage chamber 542 and a second lubricant storage chamber 544. The first and the second lubricant storage chambers 542 and 544 communicate with each other through a lubricant channel 55. The second lubricant storage chamber 544 communicates with the interior of the moving member 30 through a lubricant dispensing opening 56. The lubricant dispensing opening 56 in this embodiment communicates with the load channel 12 (also referred to as the effective thread zone) and may alternatively communicate with a space between the shaft 20 and the moving member 30 in which the balls 40 will not roll (referred to as the ineffective thread zone); the present invention has no limitations in this regard. Both the first and the second blocks 52 and 53 are provided in the second lubricant storage chamber 544 of the lubricant container 51. The distance between the first block 52 and the lubricant channel 55 is less than that between the first block 52 and the lubricant dispensing opening 56. The distance between the second block 53 and the lubricant dispensing opening 56 is less than that between the second block 53 and the lubricant channel 55. The mass of the second block is less than or equal to the mass of the first block.

Figure 4:
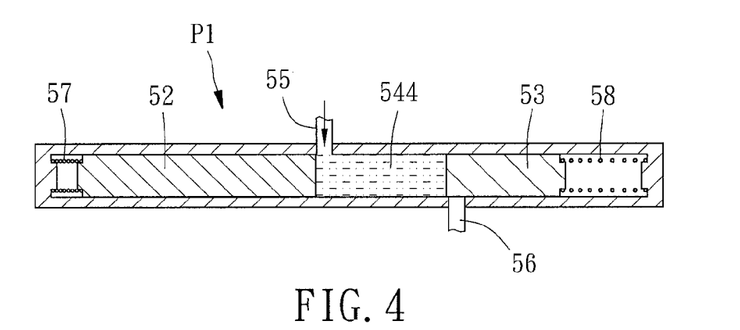
FIG. 4 is a partial sectional view of the first embodiment of the present invention, showing the first and the second blocks at the initial position.

When the moving member 30 is still, as shown in FIG. 4, the first and the second blocks 52 and 53 are at an initial position P1. The first block 52 at this position does not cover the lubricant channel 55, so the lubricant stored in the first lubricant storage chamber 542 is allowed to enter the second lubricant storage chamber 544. Meanwhile, the second block 53 covers the lubricant dispensing opening 56 to prevent the lubricant in the second lubricant storage chamber 544 from entering the interior of the moving member 30, and by doing so, the second block 53 prevents over-lubrication.

Figure 5:
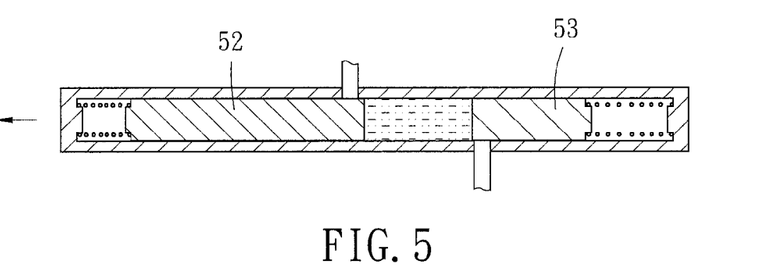
FIG. 5 is similar to FIG. 4, showing the first and the second blocks moved from the initial position toward the lubricant dispensing position.
Figure 6:
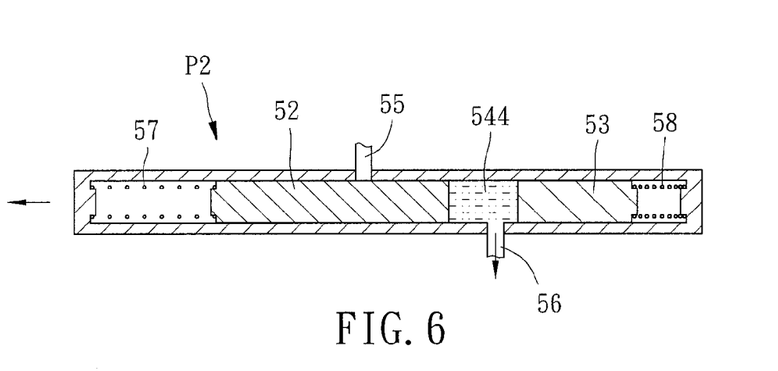
FIG. 6 is similar to FIG. 5, showing the first and the second blocks at the lubricant dispensing position.

When the moving member 30 begins to move in the direction indicated by the arrow in FIG. 5, the first and the second blocks 52, 53 are displaced due to the inertial force generated by movement of the moving member 30. Since the first block 52 has a greater mass than the second block 53, the distance by which the first block 52 is displaced is greater than that by which the second block 53 is displaced. As a result, the lubricant in the second lubricant storage chamber 544 is squeezed. Once the first and the second blocks 52 and 53 are displaced to a lubricant dispensing position P2, as shown in FIG. 6, the first block 52 covers the lubricant channel 55 to prevent the lubricant in the first lubricant storage chamber 542 from entering the second lubricant storage chamber 544, and by doing so, the first block 52 prevents an over-release of the lubricant. The second block 53, on the other hand, has uncovered the lubricant dispensing opening 56 to allow the lubricant in the second lubricant storage chamber 544 to be squeezed by the first block 52 into the interior of the moving member 30 through the lubricant dispensing opening 56 to enable self-lubrication. When the moving member 30 is subsequently moved in the opposite direction, the first and the second blocks 52 and 53 are subjected to an inertial force again and thereby displaced back to the initial position P1 shown in FIG. 4.

The lubrication unit 50 further provides a first elastic member 57 and a second elastic member 58. The two ends of the first elastic member 57 are respectively connected to an end wall of the second lubricant storage chamber 544 and the end of the first block 52 that faces away from the second block 53. The two ends of the second elastic member 58 are respectively connected to the opposite end wall of the second lubricant storage chamber 544 and the end of the second block 53 that faces away from the first block 52. When the moving member 30 is not yet moving, the first and the second blocks 52 and 53 are kept at the initial position P1 (see FIG. 4) by the forces of the first and the second elastic members 57 and 58 respectively. Once the first and the second blocks 52 and 53 move to the lubricant dispensing position P2 (see FIG. 6), the first elastic member 57 is stretched by the first block 52 and accumulates a restoring force. Meanwhile, the second elastic member 58 is compressed by the second block 53 and accumulates a restoring force too. As soon as the moving member 30 stops moving or remains constant velocity, the first and the second blocks 52 and 53 are respectively subjected to the restoring forces of the first and the second elastic members 57 and 58 and hence rapidly and precisely return to the initial position P1 shown in FIG. 4.

Figure 7:
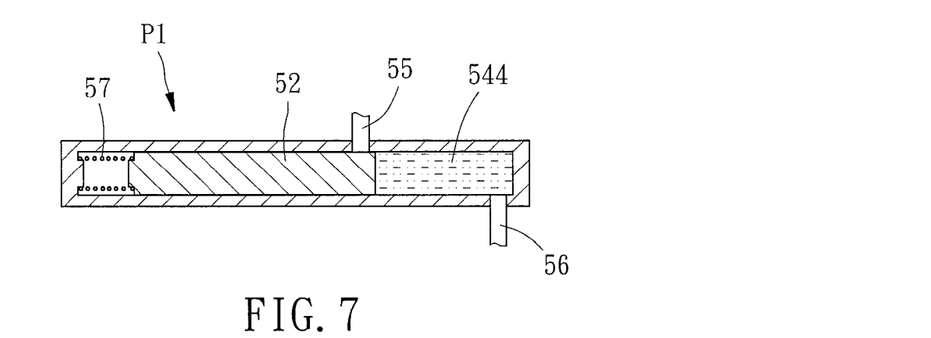
FIG. 7 is a partial sectional view of the second embodiment of the present invention, showing the first block at the initial position.
Figure 8:
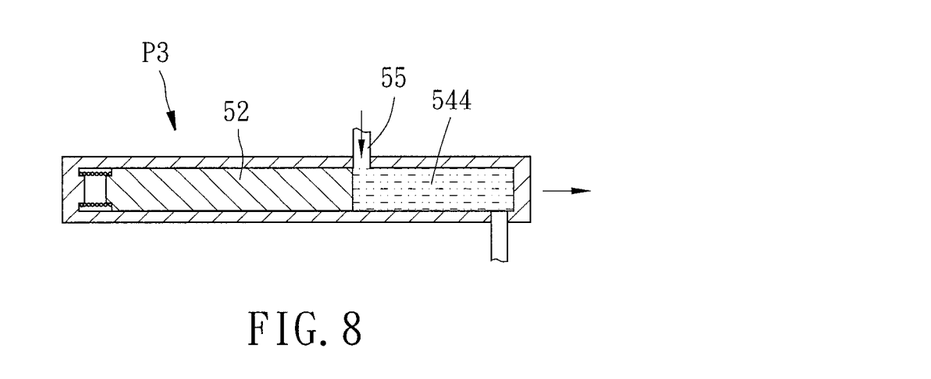
FIG. 8 is similar to FIG. 7, showing the first block at the lubricant receiving position.
Figure 9:
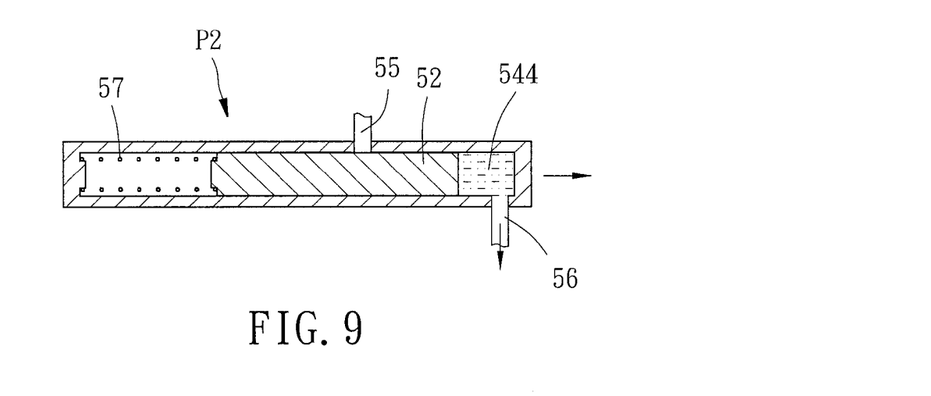
FIG. 9 is similar to FIG. 8, showing the first block at the lubricant dispensing position.

If the lubricant used in the lubrication unit 50 is highly viscous and does not flow easily, a single block suffices to enable self-lubrication. In the second embodiment of the present invention as shown in FIG. 7, the lubrication unit 50 is structurally simplified by omitting the second block 53 and the second elastic member 58, and because of that, the lubricant dispensing opening 56 is open constantly. However, a lubricant with high viscosity will not flow into the interior of the moving member 30 without being pressured. When the moving member 30 is still, as shown in FIG. 7, the first block 52 covers the lubricant channel 55 to prevent the lubricant in the first lubricant storage chamber 542 from entering the second lubricant storage chamber 544. When the moving member 30 begins to move and accelerate in the direction indicated by the arrow in FIG. 8, the first block 52 is displaced to a lubricant receiving position P3 due to inertia and therefore leaves the lubricant channel 55, as shown in FIG. 8, allowing the lubricant in the first lubricant storage chamber 542 to enter the second lubricant storage chamber 544. When the moving member 30 begins to decelerate, as shown in FIG. 9, the first block 52 is displaced to the lubricant dispensing position P2 also due to inertia, thus not only closing the lubricant channel 55 to avoid an over-release of the lubricant, but also squeezing the lubricant into the interior of the moving member 30 through the lubricant dispensing opening 56 to effect lubrication. Moreover, in the second embodiment of the present invention, the lubrication unit 50 also provides a first elastic member 57 in order to apply a restoring force to the first block 52 and keep the first block 52 precisely at the initial position P1 shown in FIG. 7 when the moving member 30 is still. It is understood that the first elastic member 57 may be dispensed with to meet practical needs.

Figure 10:
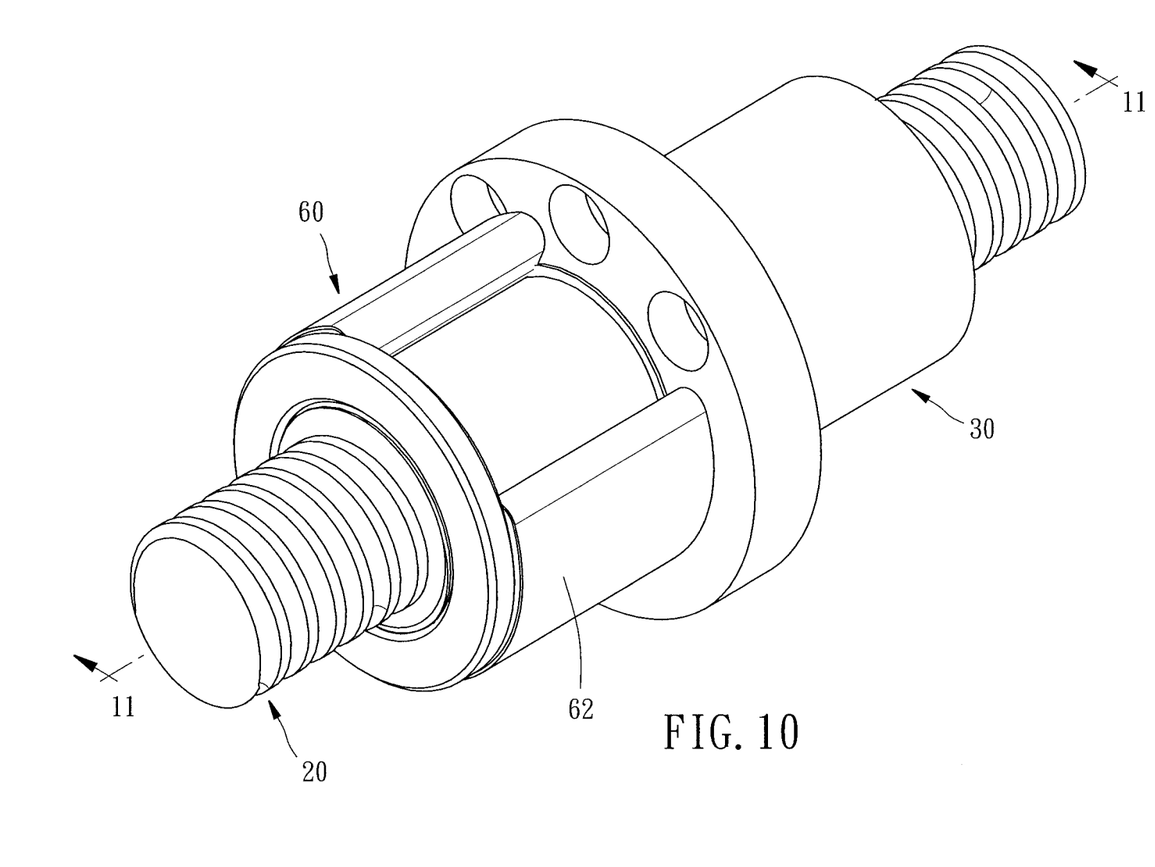
FIG. 10 is a perspective view of the third embodiment of the present invention.
Figure 11:
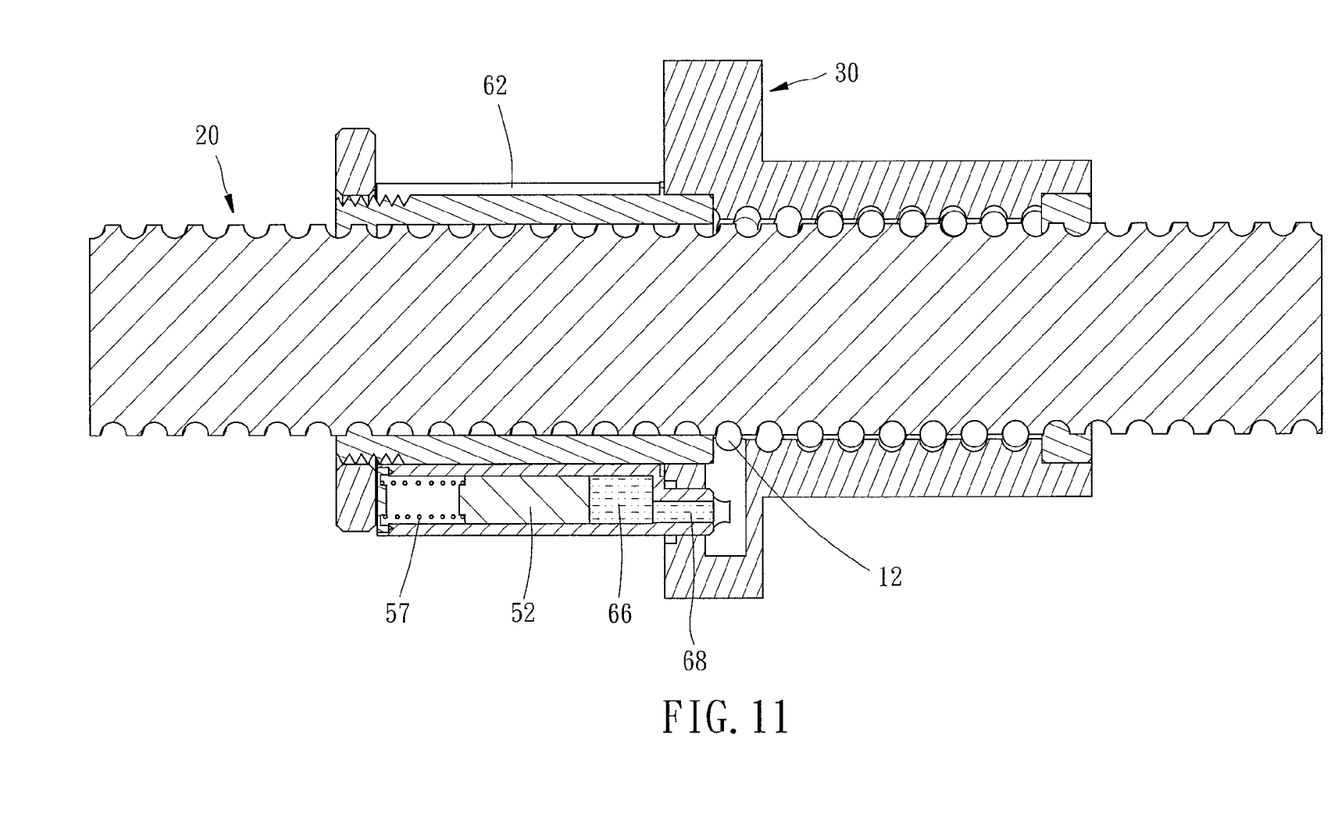
FIG. 11 is a sectional view of the third embodiment of the present invention.
Figure 12:
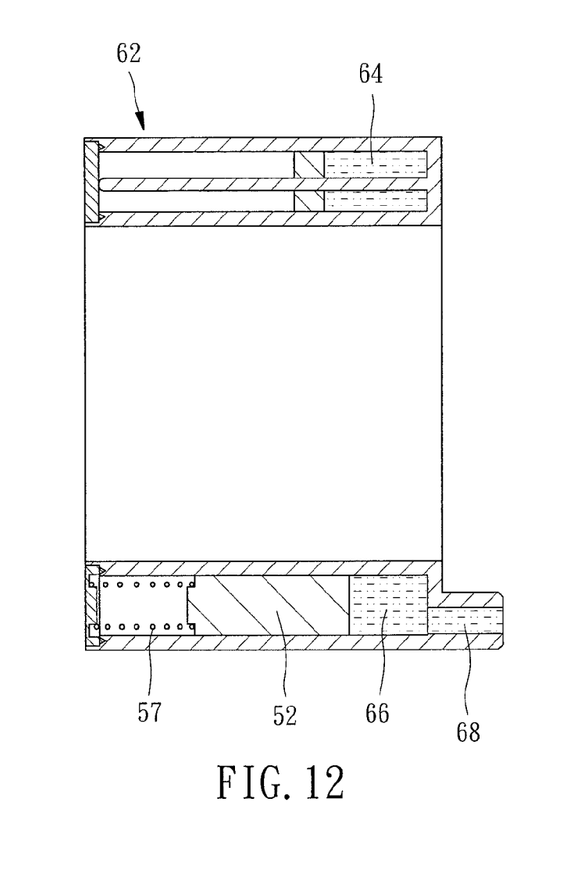
FIG. 12 is a sectional view of the lubrication unit in the third embodiment of the present invention.

Under the same principle, the lubrication unit 60 may be configured differently according to user needs. Referring to FIG. 10 to FIG. 12 for the third embodiment of the present invention, the lubricant container 62 of the lubrication unit 60 is C-shaped, is mounted around the shaft 20, and is joined to one end of the moving member 30. In terms of structure, the lubricant container 62 is similar to its counterparts in the previous embodiments in that it has a first lubricant storage chamber 64 and a second lubricant storage chamber 66, that the first block 52 is received in the second lubricant storage chamber 66, and that the first elastic member 57 is provided in the second lubricant storage chamber 66 and is connected between an end wall of the second lubricant storage chamber 66 and the end of the first block 52 that faces away from the lubricant dispensing opening 68. When the moving member 30 moves, the first block 52 pushes the lubricant with an inertial force such that the lubricant is injected through the lubricant dispensing opening 68 into the interior of the moving member 30. Once the moving member 30 stops moving, the first block 52 returns to the initial position P1 due to inertia as well as the restoring force of the first elastic member 57.

Figure 13:
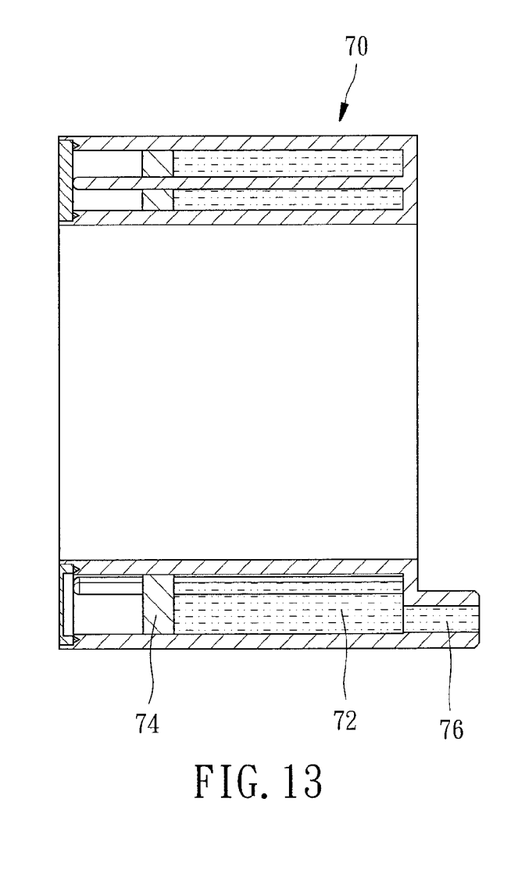
FIG. 13 is a sectional view of the lubrication unit in the fourth embodiment of the present invention.

FIG. 13 shows the fourth embodiment of the present invention, in which the lubricant container 70 has the same external appearance as the lubricant container 62 in the third embodiment but is structurally different: the single storage space 72 in the fourth embodiment is not divided into two lubricant storage chambers. The first block 74, therefore, must adapt to the structure of the lubricant container 70 and be shaped according to the storage space 72 of the lubricant container 70; in other words, the first block 74 is also C-shaped. When the moving member 30 moves, the first block 74 pushes the lubricant with an inertial force, thereby driving the lubricant through the lubricant dispensing opening 76 into the interior of the moving member 30.

Figure 14:
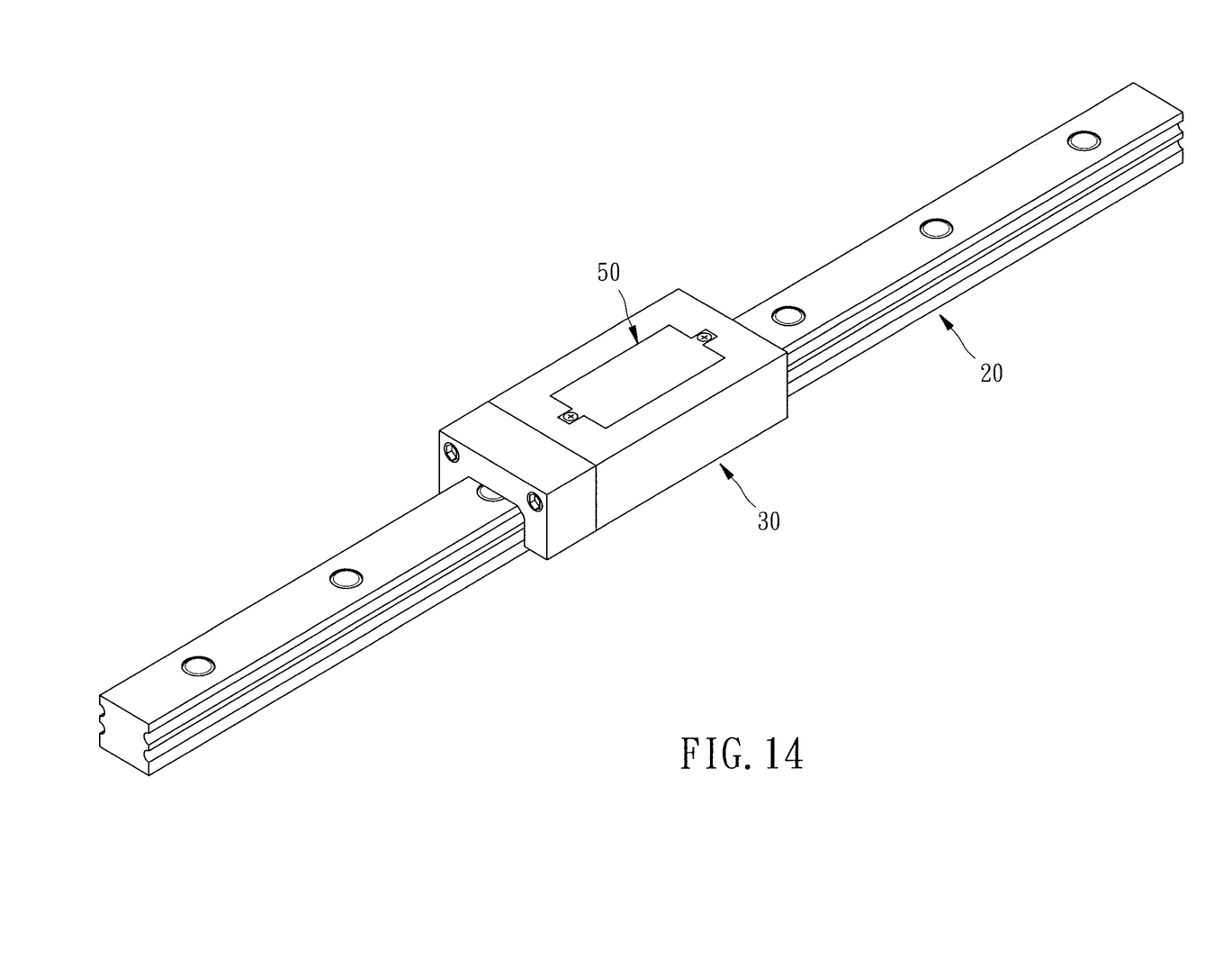
FIG. 14 is a perspective view of the fifth embodiment of the present invention.

According to the above, the linear transmission device of the present invention is so designed that each time the moving member 30 moves, the inertial force generated by the movement drives the one or two blocks in the lubricant container into displacement, and that while the one or two blocks are displaced, some of the lubricant stored is squeezed into the interior of the moving member 30 to enable self-lubrication. Compared with the prior art, the present invention not only overcomes the lubricant leakage problem, but also enhances convenience of use effectively. Last but not least, the linear transmission device of the present invention is not limited to a ball screw and may also be a linear guideway as shown in FIG. 14. In that case, the shaft 20 is a slide rail, the moving member 30 is a sliding carriage, and the lubrication unit 50 is provided on the moving member 30. This alternative form is equally capable of achieving the objective of the present invention.

What is claimed is:

1. A linear transmission device, comprising:
a shaft;
a moving member provided on the shaft and movable along an axial direction of the shaft; and
a lubrication unit having a lubricant container and a first block, wherein the lubricant container is provided at the moving member and has a storage space for storing a lubricant, the storage space has a lubricant dispensing opening through which the storage space is in communication with an interior of the moving member, and the first block is movably provided in the storage space of the lubricant container and is able to push the lubricant in the storage space into the interior of the moving member in response to movement of the moving member;
wherein the storage space is divided into a first lubricant storage chamber and a second lubricant storage chamber, the first and the second lubricant storage chambers are in communication with each other via a lubricant channel, the second lubricant storage chamber is in communication with the interior of the moving member via the lubricant dispensing opening, the lubrication unit further has a second block the second block is movably provided in the second lubricant storage chamber;
wherein when the first and the second blocks are at an initial position, the first block does not cover the lubricant channel, and the second block covers the lubricant dispensing opening; and when the first and the second blocks are at a lubricant dispensing position, the first block covers the lubricant channel, and the second block is away from the lubricant dispensing opening; and
wherein the lubrication unit further has a first elastic member and a second elastic member, the first elastic member is provided in the second lubricant storage chamber and has two ends respectively connected to an end wall of the second lubricant storage chamber and an end of the first block so as to keep the first block at the initial position, and the second elastic member is provided in the second lubricant storage chamber and has two ends respectively connected to an opposite end wall of the second lubricant storage chamber and an end of the second block so as to keep the second block at the initial position.

2. The linear transmission device of claim 1, wherein the second block has a smaller mass than the first block.

3. The linear transmission device of claim 1, wherein the lubricant container is provided at an outer periphery of the moving member.

* * * * *